United States Patent
Boutin

(10) Patent No.: US 6,666,771 B2
(45) Date of Patent: Dec. 23, 2003

(54) CRASH OPTIMIZED PLUNGING CV JOINT

(75) Inventor: Robert Anthony Boutin, Northville, MI (US)

(73) Assignee: GKN Automotive, Inc., Auburn Hills, MI (US)

( * ) Notice: Subject to any disclaimer, the term of this patent is extended or adjusted under 35 U.S.C. 154(b) by 200 days.

(21) Appl. No.: 09/899,391

(22) Filed: Jul. 5, 2001

(65) Prior Publication Data

US 2003/0008716 A1 Jan. 9, 2003

(51) Int. Cl.$^7$ .............................................. F16D 3/227
(52) U.S. Cl. ....................... 464/146; 464/178; 464/906
(58) Field of Search ................................ 464/146, 167, 464/178, 179, 906; 180/381, 384, 902; 280/777

(56) References Cited

U.S. PATENT DOCUMENTS

| | | | | |
|---|---|---|---|---|
| 2,922,680 A | * | 1/1960 | Marquis et al. | 180/381 X |
| 3,003,831 A | * | 10/1961 | King et al. | 180/381 X |
| 3,464,232 A | * | 9/1969 | Hutchinson | 464/146 |
| 3,696,638 A | * | 10/1972 | Smith et al. | 464/146 |
| 3,944,011 A | * | 3/1976 | Ernst et al. | 180/384 X |
| 4,202,184 A | * | 5/1980 | Krude et al. | 464/146 |
| 4,473,129 A | * | 9/1984 | Guimbretiere | 464/178 X |
| 4,573,947 A | * | 3/1986 | Hazebrook et al. | 464/146 |
| 5,118,214 A | | 6/1992 | Petrzelka et al. | |
| 5,230,658 A | | 7/1993 | Burton | |
| 5,320,579 A | | 6/1994 | Hoffmann | |
| 5,486,053 A | * | 1/1996 | Beagley et al. | 464/178 X |
| 5,582,546 A | | 12/1996 | Welschof | |
| 5,836,825 A | | 11/1998 | Yamane | |
| 5,911,286 A | * | 6/1999 | Boutin | 180/384 X |
| 6,171,196 B1 | | 1/2001 | Welschof | |

FOREIGN PATENT DOCUMENTS

GB 1 327 952 * 8/1973 ................. 464/146

* cited by examiner

Primary Examiner—Greg Binda
(74) Attorney, Agent, or Firm—Mick A. Hylander

(57) ABSTRACT

A propeller shaft assembly (10) comprising a constant velocity universal joint (12) including a hollow shaft (20) and a connecting shaft (18) is provided. The hollow shaft (20) includes an aft open area (34) and is connected to an outer joint part (23) that has outer ball tracks (32). The connecting shaft (18) is connected to an inner joint part (25) that has inner ball tracks (46). A ball cage (26) that has a plurality of balls (28) is included. A standard plunge (22) that has an aft plunge portion (54) is also included. The aft plunge portion (54) and the aft open area (34) having inner diameters that are greater then or equal to an inner diameter $D_1$ of the outer joint part (23). A first stop (55) limits the ball movement of travel in the aft direction. The first stop (55) is forcibly dispensable such that the connecting shaft (18) may release the first stop (55) and intrude significantly within the aft open area (34) which is outside a normal operating range (24).

16 Claims, 4 Drawing Sheets

CRASH OPTIMIZED PLUNGING CV JOINT

TECHNICAL FIELD

The present invention relates generally to motor vehicle propeller shafts, and more particularly to an apparatus for absorbing energy within a propeller shaft of a motor vehicle.

BACKGROUND OF THE INVENTION

Two-piece propeller shafts are commonly used in motor vehicle propulsion. The two-piece propeller shaft is used when larger distances exist between a front drive unit and the rear axle of the vehicle. The two-piece propeller shaft transmits torque from the front drive unit to a rear axle. The two-piece propeller shafts are typically supported by a center-bearing and corresponding support bracket. The center-bearing and support bracket support the center of the propeller shaft while still allowing the drive shaft to rotate and transfer mechanical energy from the front drive unit to the rear axle.

Besides transferring mechanical energy, it is desirable for propeller shafts to have adequate crashworthiness, be lightweight, easy and inexpensive to manufacture, and have adequate noise vibration and harshness (NVH) characteristics.

With regard to crashworthiness, it is desirable for the propeller shaft to be shortened axially to prevent it from buckling, penetrating the passenger compartment, or damaging other vehicle components in close proximity to the propeller shaft. As well, it is desirable for the shaft to absorb a considerable amount of the deformation energy.

Current designs produce a significant amount of noise and vibration that is transferred from the rotating propeller shaft to the motor vehicle. The noise and vibration is caused by a cantilever effect created by a bulk of the propeller shaft mass located a designed distance away from a center-bearing support bracket. The distance creates a cantilever arm, which increases the force of the rotating propeller shaft on the center-bearing support bracket, thereby increasing noise and vibration transferred to the motor vehicle. Imbalance of the propeller shaft can also be attributed to causing noise and vibration. However, balancing conventional propeller shafts is difficult and time consuming. To reduce noise and vibration, isolators are installed between the center-bearing support bracket and the center-bearing. The isolators in some cases are required to be balanced with the propeller shaft, which increases time and difficulty of installation.

Improved crashworthiness, reduced cost to produce and assemble, and reduced NVH are continuous ongoing concerns for vehicle powertrain engineers. Thus, there exists a need for a two-piece propeller shaft that is able to accommodate the above listed propeller shaft requirements, reduce noise and vibration transfer, and increase ease of assembly. If the above improvements can be achieved, the safety of motor vehicles may be increased, the cost of manufacturing can be reduced, and the NVH of the propeller shaft can be reduced.

SUMMARY OF THE INVENTION

Accordingly, an object of the present invention is to provide an improved propeller shaft assembly. An advantage of the present invention is that it provides improved crashworthiness, reduced NVH, and is easier to manufacture than existing two-piece propeller shaft assemblies.

The foregoing and other objects and advantages are provided by an apparatus for absorbing energy within a propeller shaft of a motor vehicle. A propeller shaft assembly including a constant velocity universal joint in a propeller shaft of a motor vehicle connecting a drive unit to a rear axle gearbox is provided. The universal joint includes at least two articulatably connected shaft portions, a hollow shaft, and a connecting shaft. The hollow shaft is connected to an outer joint part that has outer ball tracks. The hollow shaft has an aft open area and an exterior wall. The connecting shaft is connected to an inner joint part that has inner ball tracks. A plurality of torque transmitting balls are held by a cage and each are guided in one pair of corresponding outer and inner ball tracks. The ball cage holds the balls in a plane when the inner joint part is axially displaced or articulated. A standard plunge is included which is usable within a normal operating range in a damage-free way. The plunge has a fore plunge portion defined by a plane at a second stop, and an aft plunge portion defined by a plane at a first stop. The aft plunge portion and the aft open area having inner diameters that are greater then or equal to an inner diameter of the outer joint part. When the outer joint part is displaced relative to the inner joint part the movement of the balls is limited in an aft direction relative to the hollow shaft by the first stop to remain within the normal operating range. The first stop is forcibly displaceable, however, such that the connecting shaft may release the first stop and intrude significantly within the aft open area which is beyond the normal operating range.

One of several advantages of the present invention is that it may forcibly collapse within itself at a predetermined load.

Another advantage of the present invention is that it minimizes the number of components used as compared to conventional shaft assemblies, thereby reducing mass and imbalance of the vehicle propeller shaft. Reduced mass and imbalance improves quality, decreases noise and vibration, and reduces costs in production and manufacturing of the propeller shaft.

Another advantage of the present invention is that the majority of the mass of the propeller shaft assembly is directly supported by the center-bearing, providing improved balance and decreased noise and vibration.

The present invention itself, together with further objects and attendant advantages, will be best understood by reference to the following detailed description, taken in conjunction with the accompanying drawings.

BRIEF DESCRIPTION OF THE DRAWING

For a more complete understanding of this invention reference should now be had to the embodiments illustrated in greater detail in the accompanying figures and described below by way of examples of the invention wherein.

DETAILED DESCRIPTION OF THE PREFERRED EMBODIMENT

In the following description, various operating parameters and components are described for one constructed embodiment. These specific parameters and components are included as examples and are not meant to be limiting.

While the present invention is described with respect to an apparatus for absorbing energy within a propeller shaft of a vehicle the following apparatus is capable of being adapted for various purposes including: automotive vehicles, motor systems that use a propeller shaft, or other vehicle and non-vehicle applications that require energy absorption within a propeller shaft.

Figure 1:
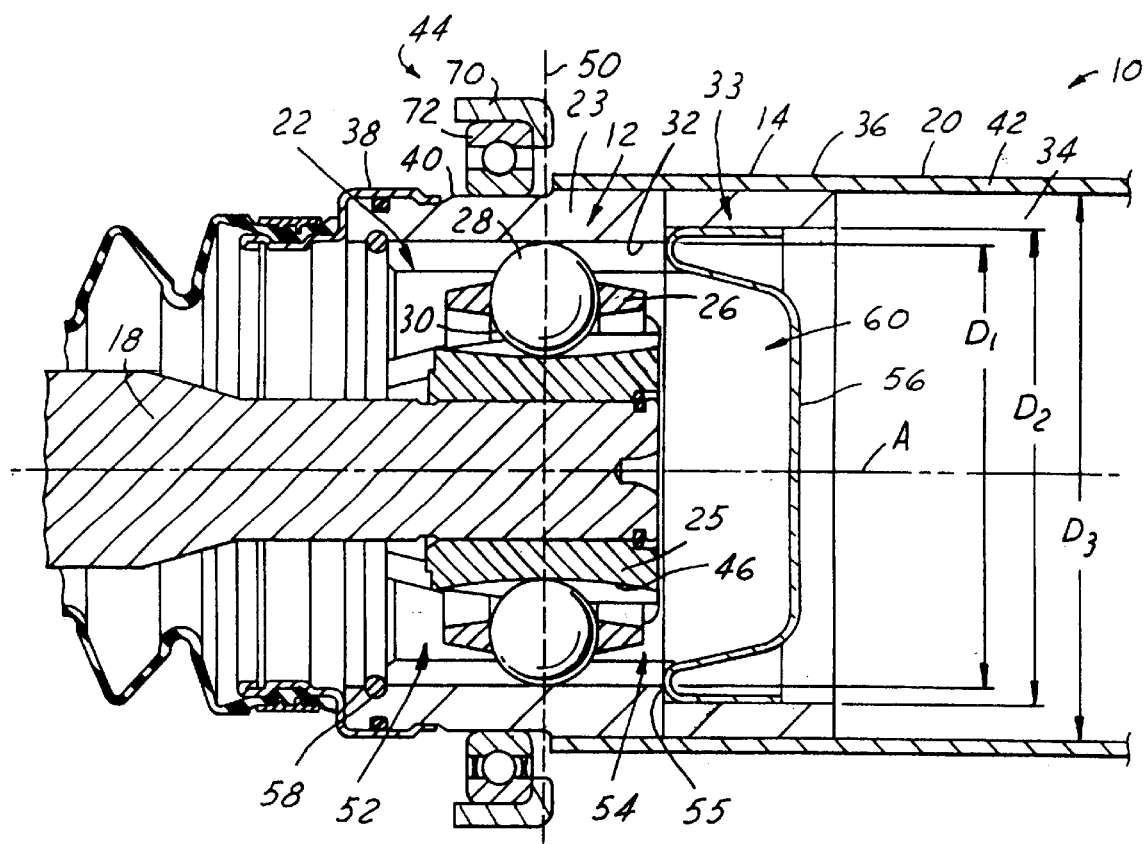
FIG. 1 is a cross-sectional view of a propeller shaft assembly including a constant velocity universal joint in a propeller shaft of a motor vehicle positioned as if during "normal" operation and in accordance with one embodiment of the present invention.

Referring now to FIG. 1, a cross-sectional view of a propeller shaft assembly 10 comprising a constant velocity (CV) universal joint 12 in a propeller shaft 14 of a motor vehicle positioned as if during "normal" operation and in accordance with the present invention is shown. Although the propeller shaft 14 of the present invention is illustrated as having two articulatable shaft portions (a connecting shaft portion 18 and a hollow shaft portion 20) more shaft portions may be incorporated. The connecting shaft 18 and the hollow shaft 20 together form a standard plunge 22, which is usable within a normal operating range in a damage-free way.

The CV joint 12 is an axially plungeable constant velocity universal joint that is plungeable along a center axis 'A'. The CV joint 12 includes an outer joint part 23, an inner joint part 25, a ball cage 26 and torque transmitting balls 28 each held in a cage window 30. The outer ball tracks 32 have an inner diameter $D_1$ that is smaller than a diameter $D_2$ of an open end of the outer joint part 23.

The inner joint part 25 has inner ball tracks 46. Although, the inner ball tracks 46 as shown are arcuate in shape, they may have a constant diameter along axis A. The outer joint part 23 includes outer ball tracks 32. The outer joint part 23 has an inner diameter $D_1$ and an open end 33 that has an inner diameter $D_2$.

The hollow shaft portion 20 is connected to a rear axle gearbox of a vehicle. The hollow shaft portion 20 is also connected to the outer joint part 23. The hollow shaft portion 20 also includes an aft open area 34 having an inner diameter $D_3$ and an exterior wall 36.

The exterior of the tubular assembly includes three regions: a forward portion 38, a recessed center-bearing guide 40, and a rear tube section 42. The diameter of the forward portion 38 and the rear tube section 42 are larger than the diameter of the recessed center-bearing guide 40. In addition, the diameter of the forward portion 38 is small enough to allow a center-bearing support bracket assembly 44 containing a center-bearing 72 to translate along the axis A, but is also large enough to prevent the center-bearing bracket 70 from sliding off the hollow shaft 20. The rear tube section 42 also prevents the center-bearing support bracket assembly 44 from slipping off the recessed center-bearing guide 40.

The connecting shaft portion 18 is connected to a drive unit such as a transmission of a vehicle. The connecting shaft portion 18 is also connected to the inner joint part 25. The balls 28 are each guided by the outer ball tracks 32 and inner ball tracks 46. The outer ball tracks 32 and the inner ball tracks 46 are associated with each other, prevent lateral movement of the connecting shaft 18 within the hollow shaft 20, and allow axial movement along axis A. The ball cage 26 has multiple cage windows 30 each accommodating one of the balls 28 and holding the balls 28 in a plane 50 when the inner joint part 25 is axially displaced or articulated. The plane 50 divides the standard plunge 22 into a fore plunge portion 52 and an aft plunge portion 54. The ball cage 26 is located in the center of the outer joint part 23, thereby providing rotatable support where a majority of the mass of the joint 12 exists. The connecting shaft 18 may displace in an axial direction along axis A. The connecting shaft 18 is limited in the aft direction by a first stop 55, of a grease cap 56, and in the fore direction by a second stop 58.

Although, the first stop 55 of an embodiment of the present invention is part of the grease cap 56 that seals and prevents grease within the joint from escaping to the aft plunge portion 54 and aft open area 34, other style stops that serve the same or similar function may be incorporated. The grease cap 56 also prevents contaminants from within the hollow shaft 20, such as dirt, from entering the joint. The grease cap 56 is shown as being pressed-fit into the open end of the outer joint part 23. The grease cap 56 may be attached using any method known in the art. The grease cap 56 conforms to the general shape of the ball cage 26 and forms a pocket 60 for the inner joint part 25 and ball cage 26 to travel within during a standard plunge. The ball cage 26 may intrude at least partially within the pocket 60. The grease cap 56 also prevents the joint 12 from overcompressing during normal operation, thereby, preventing the ball cage 26 from exceeding the length of the outer ball tracks 32 and dismantling. The grease cap 56 may be of various materials including: aluminum, steal, plastic, ceramic, rubber, or other material that is able to be released under a predetermined load. When the outer joint part 23 is displaced relative to the inner joint part 25, the connecting shaft 18 is limited in displacement to the normal operating range defined by the length of the outer ball tracks 32, between the first stop 55, and the second stop 58.

The second stop 58 may be a rigid stop, a rolling boot, a curvature or formation of the outer ball tracks 32. Other methods of limiting the movement of the connecting shaft in the fore direction are also contemplated. The second stop 58 preferably seals off the fore plunge portion 52.

Figure 2:
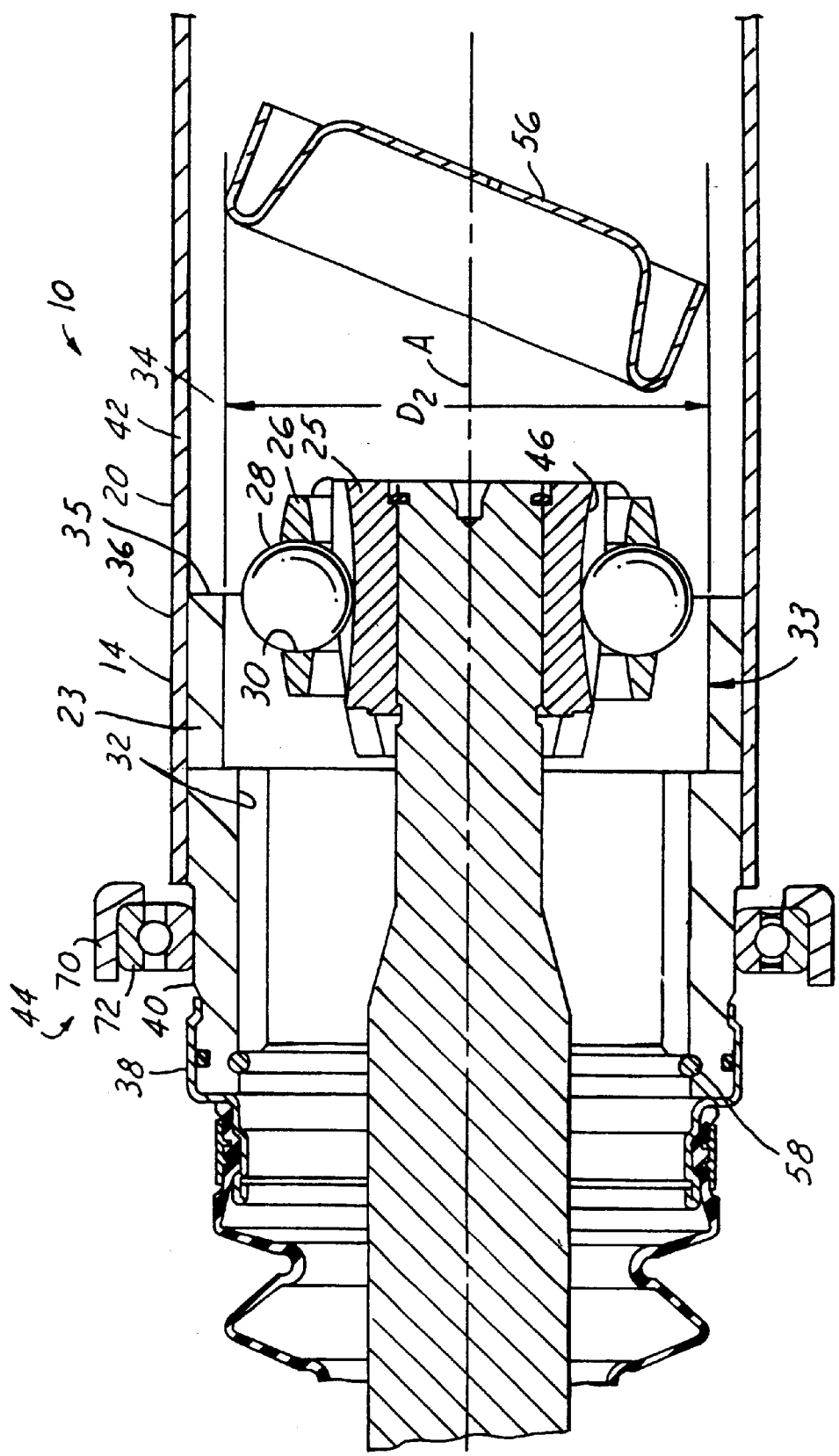
FIG. 2 is a cross-sectional view of the propeller shaft assembly including a constant velocity universal joint in a propeller shaft of a motor vehicle positioned outside a normal operating range and in accordance with an embodiment of the present invention.

Referring now to FIG. 2, a cross-sectional view of the propeller shaft assembly 10 including a constant velocity universal joint 12 in a propeller shaft 14 of a motor vehicle positioned outside the normal operating range and in accordance with an embodiment of the present invention is shown. During forcible loads above a predetermined amount, the connecting shaft 18 attached to the ball cage 26 releases the first stop 56 and collapses the connecting shaft 18 into the hollow shaft 20. The connecting shaft 18 may intrude significantly and collapse within the aft open area 34 as shown, which is outside the normal operating range. The inner diameters $D_3$ and $D_2$ are greater than or equal to the diameter $D_1$ allowing the collapsing action to occur The collapsing of the connecting shaft 18 into the hollow shaft 20 contains any debris created by the propeller shaft assembly 10, during a collision, within the hollow shaft 20. Additionally, the collapsing design of the present invention prevents the propeller shaft assembly 14 from deforming and damaging other components of the vehicle in close proximity to the propeller shaft 14.

Figure 3:
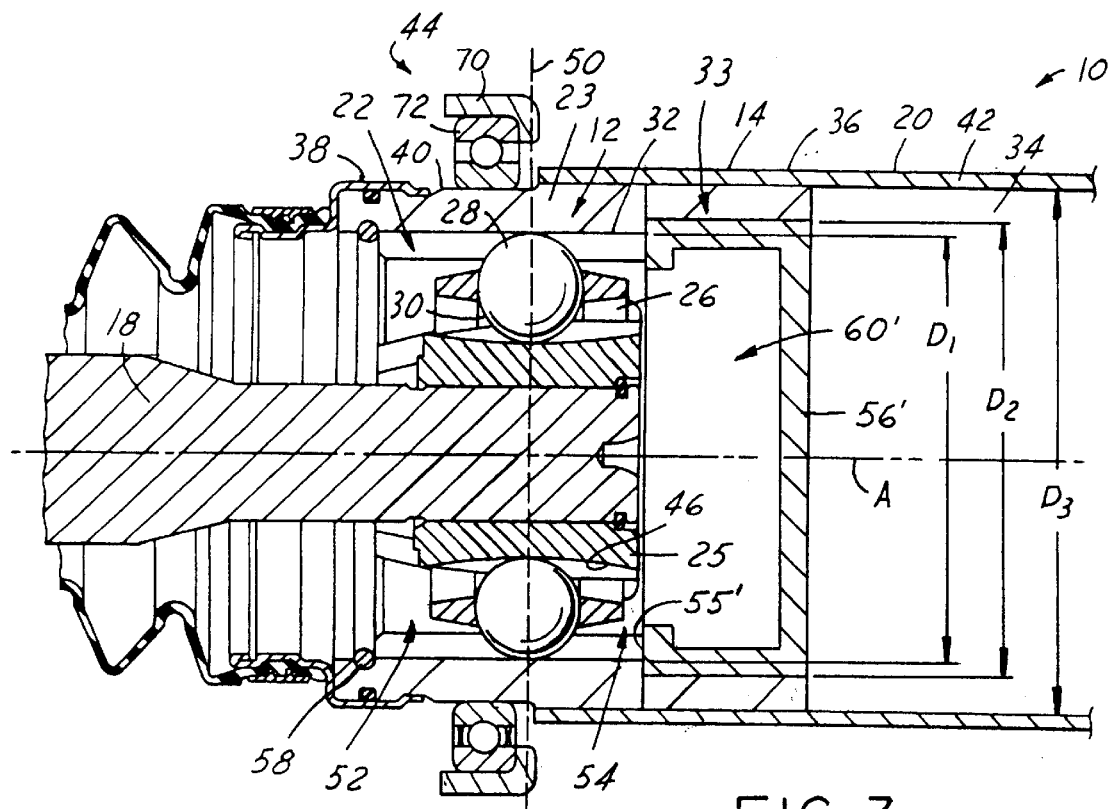
FIG. 3 is a cross-sectional view of a propeller shaft assembly including a constant velocity universal joint in a propeller shaft of a motor vehicle positioned during "normal" operation and in accordance with another embodiment of the present invention.

Referring now to FIG. 3, a cross-sectional view of a propeller shaft assembly 10 including a constant velocity universal joint 12 in a propeller shaft 14 of a motor vehicle positioned during normal operation and in accordance with another embodiment of the present invention is shown. The assembly 10 includes a grease cap 56' having a first stop 55' illustrating a contemplated alternative to the above described grease cap 56 and first stop 55. The grease cap 56' also has a slightly different pocket 60' than the pocket 60, while still performing the same function. The grease cap 56', as with the grease cap 56, may be attached to the rear tube section 42 if it is pressed-fit within the diameter $D_3$ instead of the open end of the outer joint part 23 within the diameter $D_2$.

Figure 4:
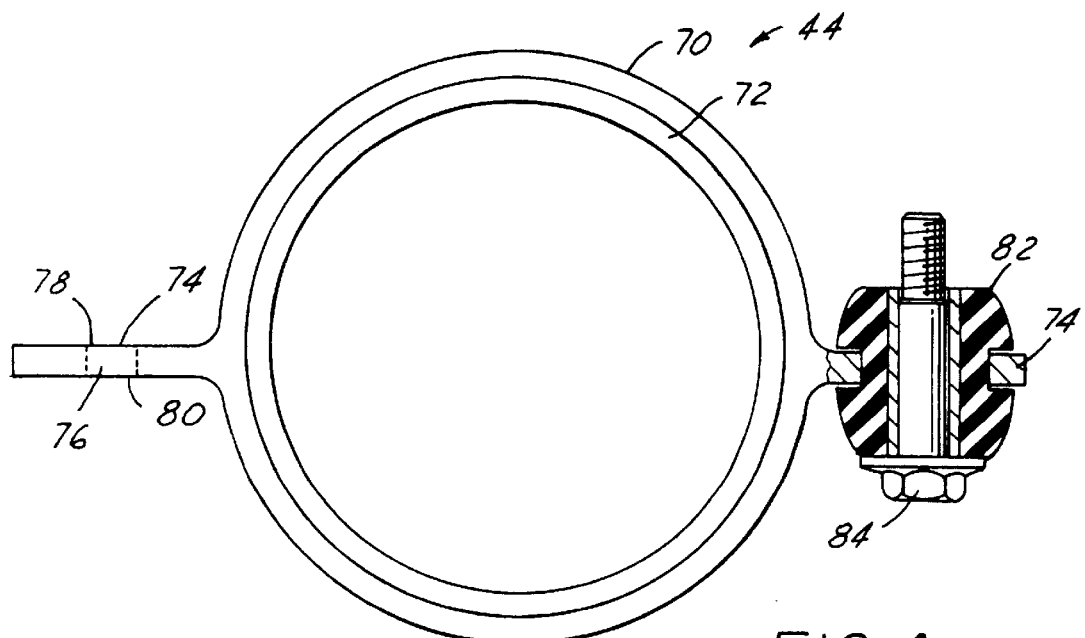
FIG. 4 is a cross-sectional view of a center-bearing support bracket assembly for supporting the propeller shaft assembly in accordance with an embodiment of the present invention.

Referring now to FIG. 4, a cross-sectional view of a center-bearing support bracket assembly 44 for supporting the propeller shaft assembly 10 in accordance with an embodiment of the present invention is shown. The center-bearing support bracket assembly 44 includes a center-bearing bracket 70, which contains a center-bearing 72. The bracket 70 includes a pair of flanges 74 extending outwardly from the bracket 70. The flanges 74 have a pair of holes 76 with a topside 78 and a bottom side 80. A pair of isolators 82 extend through the holes 76 and overlap the top sides 78 and bottom sides 80. The isolators 82 may be produced from, but are not limited to, any of the following materials: rubber, fabric, elastomers, synthetics, plastic, polyvinyl chloride, polyvinyl acetate, polypropylene, polyethylene or other isolating material. A pair of fasteners 84 extend through the isolators 82 and fasten the bracket 70 to the frame of a motor vehicle.

With reference to FIGS. 1 and 4, the bracket 70 extends around the recessed center-bearing guide 40 and isolates the propeller shaft assembly 10 from a motor vehicle. The bracket 70 may be solidly mounted to a motor vehicle, which increases balancing of the propeller shaft 14. Supporting the propeller shaft assembly at the center-bearing guide provides support directly where a majority of the propeller shaft mass exists. This minimizes the amount of noise and vibration transferred to the motor vehicle. Directly supporting the majority of the mass also provides for increased ease of balancing the propeller shaft 14. For the above stated reasons, the propeller shaft 14 does not need to be balanced with the isolators 82 before being installed onto a vehicle. The quality of the balancing of the propeller shaft is therefore increased, because of the use of direct support.

The flanges 74 may be of various shapes and sizes. The flanges 74 may also be rigid and integrally formed with the bracket 70 as illustrated, or be separate individual components. The flanges 74 in combination with the isolators 82 and the fasteners 84 are used to fasten and isolate the bracket 70 from a motor vehicle. Therefore, the flanges 74, isolators 82, and fasteners 84 may also be integrally formed as a single unit, or assembled together as separate components as shown. The flanges 74, isolators 82, and fasteners 84 may be of various other styles known in the art.

Figure 5:
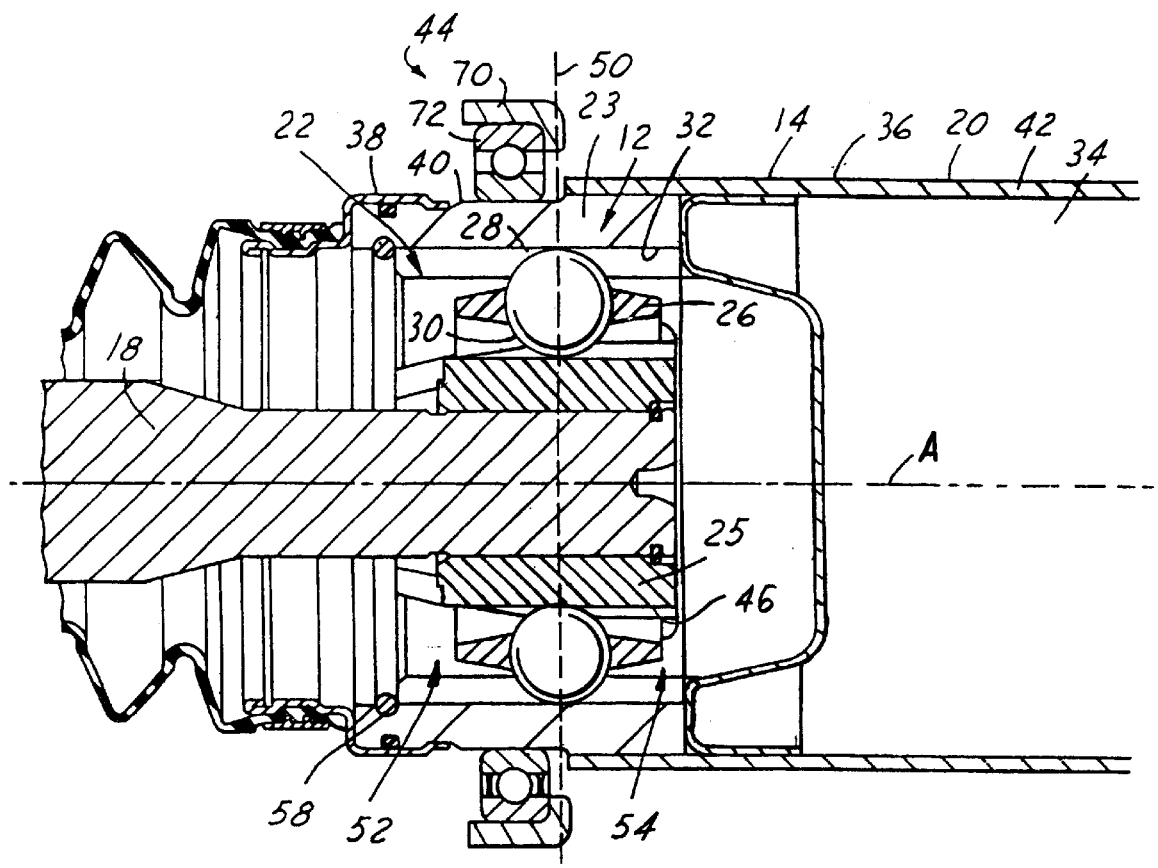
FIG. 5 is a cross-sectional view of a propeller shaft assembly similar to FIG. 1 in accordance with an alternative embodiment of the present invention.

Referring now to FIG. 5, there is shown an alternate embodiment of a propeller shaft assembly according to the present invention. FIG. 5 is similar to FIG. 1, but FIG. 5 differs from FIG. 1 in two aspects. The inner ball tracks 46 of the inner joint part 25 are set at a constant distance with respect to the center axis A. Thus, the inner ball tracks 46 are straight rather than arcuate as shown in FIG. 1. Also, the grease cap 56 is press-fit into the opening 34 of the hollow shaft portion 20 rather than the outer joint part 23. FIG. 5 is otherwise the same as FIG. 1 and, to that extent, reference is made to the description thereof.

The ability of the propeller shaft assembly to collapse within itself at predetermined loads and in a predefined manner improves safety during vehicle impacts and improves crash worthiness of a motor vehicle, in general. Furthermore, fewer components, improved balance, and reduction in rotating mass reduces production costs and increases operating efficiency of the propeller shaft.

The above-described apparatus, to one skilled in the art, is capable of being adapted for various purposes and is not limited to the following applications: automotive vehicles, motor systems that use a propeller shafts or other vehicle and non-vehicle applications that require energy absorption within a propeller shaft. The above-described invention may also be varied without deviating from the spirit and scope of the invention as contemplated by the following claims.

What is claimed is:

1. A propeller shaft assembly for a vehicle comprising:
   a constant velocity universal joint comprising;
   an outer joint part having outer ball tracks at a constant distance from a rotational center axis, said outer ball tracks defining a first diameter ($D_1$), and a cylindrical open end having a second diameter ($D_2$);
   an inner joint part with inner ball tracks;
   a plurality of torque transmitting balls each guided in a corresponding pair of said outer and inner ball tracks; and
   a ball cage having a plurality of cage windows each accommodating one of said balls and holding said balls in a plane when said inner joint part is axially displaced or articulated;
   a hollow shaft connected to said outer joint part having an aft open area defining a third diameter ($D_3$); and
   a connecting shaft connected to said inner joint part;
   said constant velocity joint forming a standard plunge usable within a normal operating range in a damage-free way wherein said normal operating range is limited by a displaceable first stop acting against said connecting shaft at said open end of said outer joint part and a second stop on said outer ball tracks;
   wherein said first diameter ($D_1$) is less than said second diameter ($D_2$) and said third diameter ($D_3$) such that, upon displacement of said first stop, said connecting shaft and inner joint part may release into said outer joint part open end.

2. The assembly according to claim 1 wherein said first stop comprises a grease cap.

3. The assembly of claim 2 wherein said grease cap has the general shape of said ball cage and forms a pocket, said ball cage being moveable within said pocket.

4. The assembly of claim 2 wherein said grease cap is displaceably attached to said hollow shaft.

5. The assembly of claim 1 wherein said inner ball tracks are a constant distance from a rotational center axis extending through a center of the constant velocity joint.

6. The assembly of claim 1 wherein said inner ball tracks are a variable distance from a rotational center axis extending through a center of the constant velocity joint.

7. The assembly of claim 1 wherein said inner ball tracks are arcuate shaped with respect to a rotational center axis extending through a center of the constant velocity joint.

8. The assembly of claim 1 comprising a recessed center-bearing guide for receiving a center-bearing support bracket said recessed center bearing guide being formed on an exterior of said outer joint part.

9. The assembly of claim 8 comprising:
   a rear tube section located rearward of said recessed outer bearing guide and having a larger diameter than said recessed center-bearing guide;
   a forward portion located forward of said recessed center bearing guide and having a larger outer diameter than said recessed center-bearing guide;

said rear tube section and said forward portion forming stops to maintain said center-bearing support bracket on said recessed center-bearing guide.

10. The assembly of claim 8 wherein said recessed center-bearing guide is located on said outer joint part at a position corresponding to a majority of the propeller shaft assembly mass.

11. The assembly of claim 8 wherein the hollow shaft is supported by a center-baring support bracket which extends around said recessed center-bearing guide, said center-bearing support bracket isolating said hollow shaft from said vehicle.

12. The assembly of claim 11 wherein said center-bearing support bracket further comprises:

a pair of flanges extending outwardly from said center-bearing support bracket, each flange having a hole formed therein;

an isolator extending though each of said holes and overlapping a top side and a bottom side of each of said flanges;

a fastener extending through each of said isolators, said fasteners securing said center-bearing support bracket to said vehicle.

13. The assembly of claim 12 wherein said isolators are produced from a material comprising at least one of: rubber, fabric, elastomers, synthetics, plastic, polyvinyl chloride, polyvinyl acetate, polypropylene, and polyethylene.

14. A propeller shaft assembly for connecting a drive unit to a rear axle gearbox of a vehicle, said assembly comprising:

a hollow shaft connected to an outer joint part with outer ball tracks at a constant distance from a rotational center axis, said outer ball tracks defining a first diameter ($D_1$), said hollow shaft comprising an aft open area defining a second diameter ($D_3$), wherein said second diameter is greater than said first diameter;

a connecting shaft connected to an inner joint part with inner ball tracks;

a plurality of torque transmitting balls each guided in a corresponding pair of said outer and inner ball tracks;

a ball cage having a plurality of cage windows each accommodating one of said balls and holding said balls in a plane when said inner joint part is axially displaced or articulated;

a standard plunge which is usable within a normal operating range in a damage-free way along said outer ball tracks up to a first stop; and a grease cap releasably secured into said aft open area and forming said first stop acting against said connecting shaft, said grease cap being forcibly displaceable such that said connecting shaft may release said grease cap and intrude within said aft open area which is outside said normal operating range.

15. The assembly of claim 14 further comprising:

a center-bearing support bracket assembly comprising a pair of flanges extending outwardly, each flange having a hole formed therein, an isolator extending through each of said holes and overlapping a top side and a bottom side of each of said flanges, and a fastener extending through each of said isolators, said fasteners for securing said center-bearing support bracket assembly to said vehicle, wherein said center-bearing support bracket assembly extends around a recessed center-bearing guide and isolates said hollow shaft from said vehicle.

16. The assembly of claim 15 wherein said recessed center-bearing guide is located on said outer joint part at a position corresponding to a majority of the propeller shaft assembly mass.

* * * * *